United States Patent
Laroia et al.

(10) Patent No.: US 7,406,058 B2
(45) Date of Patent: Jul. 29, 2008

(54) METHODS AND APPARATUS OF TRANSMITTING USER DATA USING TRAFFIC CHANNELS

(75) Inventors: Rajiv Laroia, Basking Ridge, NJ (US); Junyi Li, Bedminster, NJ (US); Sathyadev Venkata Uppala, Scotch Plains, NJ (US)

(73) Assignee: QUALCOMM, Incorporated, San Diego, CA (US)

( * ) Notice: Subject to any disclaimer, the term of this patent is extended or adjusted under 35 U.S.C. 154(b) by 771 days.

(21) Appl. No.: 10/640,973

(22) Filed: Aug. 13, 2003

(65) Prior Publication Data

US 2005/0036456 A1 Feb. 17, 2005

(51) Int. Cl.
*H04Q 7/00* (2006.01)

(52) U.S. Cl. .................. 370/328; 370/352; 370/401; 455/450

(58) Field of Classification Search ........... 370/328, 370/352, 401, 329, 349, 337, 341, 348, 395.41, 370/321, 322, 344, 208; 455/450, 452.2
See application file for complete search history.

(56) References Cited

U.S. PATENT DOCUMENTS

| | | | | |
|---|---|---|---|---|
| 5,539,728 A | * | 7/1996 | Gaiani et al. ............. 370/342 |
| 5,713,075 A | * | 1/1998 | Threadgill et al. ......... 455/427 |
| 5,732,113 A | * | 3/1998 | Schmidl et al. ............ 375/355 |
| 5,956,642 A | * | 9/1999 | Larsson et al. ............ 455/449 |
| 5,970,062 A | * | 10/1999 | Bauchot ................. 370/310.2 |
| 6,275,506 B1 | * | 8/2001 | Fazel et al. ................ 370/478 |
| 6,282,428 B1 | | 8/2001 | Ho et al. |
| 6,292,917 B1 | * | 9/2001 | Sinha et al. ................ 714/752 |
| 6,385,190 B1 | * | 5/2002 | Malkamaki et al. ......... 370/347 |
| 6,400,773 B1 | * | 6/2002 | Krongold et al. ........... 375/260 |
| 6,497,599 B1 | | 12/2002 | Johnson et al. |
| 6,608,827 B1 | | 8/2003 | Austin |
| 6,819,930 B1 | * | 11/2004 | Laroia et al. ............... 455/450 |
| 7,095,708 B1 | * | 8/2006 | Alamouti et al. ........... 370/208 |
| 7,133,354 B2 | * | 11/2006 | Laroia et al. ............... 370/208 |
| 2001/0009555 A1 | * | 7/2001 | Diepstraten et al. ........ 370/468 |
| 2001/0055297 A1 | * | 12/2001 | Benveniste ................ 370/349 |
| 2002/0003773 A1 | * | 1/2002 | Okada et al. ............... 370/208 |
| 2002/0126685 A1 | * | 9/2002 | Leatherbury et al. ....... 370/432 |
| 2002/0126768 A1 | * | 9/2002 | Isaksson et al. ............ 375/298 |
| 2002/0160801 A1 | * | 10/2002 | Uesugi ..................... 455/522 |
| 2005/0100120 A1 | * | 5/2005 | Barton et al. .............. 375/347 |

OTHER PUBLICATIONS

PCT International Search Report for International Application No. PCT/US03/25511, filed on Aug. 13, 2003.

* cited by examiner

*Primary Examiner*—Chi H. Pham
*Assistant Examiner*—Alexander Boakye
(74) *Attorney, Agent, or Firm*—Straub & Pokotylo; Michael P. Straub; Ronald P. Straub (57) ABSTRACT

The invention describes methods and apparatus to structure the air link resources, e.g. traffic channel, into segments of different transmission segment types and effectively use that novel structure. Different segment types are structured to achieve different performance characteristics. The segments may be aligned with different offsetting start times chosen to minimize the variation in the maximum number of segments starting at any given time slot. This staggering of segment start times minimizes waste in unused assignment messages due to structural inefficiencies, and has an overall effect of balancing the traffic. Information collected on the channel quality that various user's are experiencing may be used to classify the users. Stored information on different segment types, each with different benefits, is used in the allocation process to effectively match classified users to well-suited segment types to increase performance, balance the system, conserve power, and satisfy the users.

49 Claims, 7 Drawing Sheets

METHODS AND APPARATUS OF TRANSMITTING USER DATA USING TRAFFIC CHANNELS

FIELD OF THE INVENTION

The present invention is directed to wireless communications systems and more particularly, to methods and apparatus for constructing, organizing, and allocating traffic channel segments in order to use the air link resource in an efficient manner.

BACKGROUND

In a wireless communication system, air link resources generally include bandwidth over time or code over time. The air link resource that transports data and/or voice traffic is called a traffic channel. The design of the traffic channel, e.g., how to partition the bandwidth over time available and how to allocate the partitioned bandwidth over time between competing users, is important, as the traffic channel generally occupies the major portion of the system's air link resource.

A plurality of users, e.g., wireless terminals, throughout the cells of the system will be operating concurrently and will request use of the traffic channel for the transmission of data and/or voice traffic, e.g. segments of the traffic channel(s) of the system. The number and type of users will vary in the system over time and compete for those air link resources. The levels of resource requested by different types of users, e.g., a wireless data terminal vs a cell phone will also vary. The level of resource requested by a single user will change over time, e.g. a wireless terminal may transition between states from a sleep state to a hold state to an on state, with each state requiring different levels of resources. The levels of performance tolerated, requested, or required by different users in terms of: acceptable signal-to-noise levels, tolerated error rates, tolerated delays between requests for resources and grants of resources, power requirements, and burst data rates may also vary. The location of the user, e.g., wireless terminal, with respect to: the base station, adjacent cell/sector introducing interference, and obstructions may influence the selection of how to divide and allocate the available air link resource.

Certain structures of traffic segments, e.g., more bandwidth per segment maybe more advantageous for one set of problems, while other types of structures, e.g., less bandwidth but for a longer time duration may be more beneficial to address other concerns.

Based upon the above discussion, it should be apparent that there is a need for improved methods and apparatus for segmenting and/or using communications resources.

SUMMARY OF THE INVENTION

In a wireless communications system the air link resource, e.g., bandwidth over time or code over time, that transmits information is called a channel. The description of this summary is made with reference to an exemplary OFDM system; however the invention is also applicable to other types of communication systems, e.g., CDMA. Communications systems may have a plurality of channels, such as, e.g., an uplink traffic channel for data and/or voice transmissions from the wireless terminals to the base station, a downlink traffic channel for data and/or voice transmissions from a base station to the wireless terminals, request channels, and assignment channels.

The transmission units that carry the information, are grouped into transmission segments. In the case of an exemplary OFDM implementation transmission units may be in the form of tone-symbols where a tone-symbol represents one tone that is allocated for use for one symbol transmission time. The transmission segment is the basic unit of a channel. Over time, a series of segments are assigned for each channel. The invention describes methods and apparatus for constructing, organizing, and allocating transmission segments in order to utilize the air link resource in an efficient manner, minimize interference levels amongst users, reduce overhead, conserve energy of users, balancing the system, provide flexibility, and increase overall system performance. The channels may be subdivided, e.g. in the frequency domain into sets of tones. The subdivided channels may be referred to as sub-channels or simply as channels. For example, an uplink traffic channel may be subdivided into a plurality or channels, e.g., with each channel having a set of assigned tones.

Each channel may be subdivided into a plurality of segments in the time domain. In accordance with the invention, there may be a plurality of different transmission segment types. Different transmission segment types are structured, in accordance with the invention, to achieve different benefits. Sets of information defining each transmission segment type are stored in memory prior to assigning segments of the transmission segment type to one or more transmitters.

The sets of information defining the transmission segment types includes information specifying a number of transmission units to be transmitted over a period of time, e.g. number of tone-symbols/segment. The period of time is segmented into slots. The time slot may correspond to the time used to transmit any single transmission unit, e.g. the time slot may be an OFDM symbol time. Alternatively, the time slot may be a fixed number of OFDM symbol times. Segments of each transmission segment type includes a specified number of transmission units per unit time, e.g. total number of tone-symbols/time slot. The period of time over which a segment of a transmission segment is transmitted may be different for different transmission segment types, e.g., some segments occupy more time than other segments. In some embodiments, the number of transmission units per unit time for one type of transmission segment may be the same as for another type of transmission segment, e.g., same number of tone-symbols in each segment. In some embodiments, the number of transmission units per unit time for segments of different transmission segment type may be different, e.g. some segments may have occupy more tones in the frequency domain than other segments.

In some embodiments, the number of transmission units per segment may be different or some of the segments. In some embodiments, the total number of transmission units per segment may be the same for one transmission segment type as for another transmission segment type, e.g., the same total number of tone-symbols are in each segment. This embodiment has advantages in facilitating rapid retransmission, as any lost segment will fit into any other segment and thus delay is reduced in segment allocation for retransmission purposes. This embodiment also has advantages in allowing flexibility in allocation, in allowing relative characteristics to be pre-defined between different types of segments, and then allowing the segments to be allocated to users to take advantage of those properties.

There may be a plurality of N traffic channels, and sets of information on each of those traffic channels may be defined and stored, in accordance with the invention. The information on each traffic channel includes information defining segments of a specific transmission segment type and information indicating start times of segments within the channel. In accordance with the invention, the start times of segments within different channels may be different.

In some embodiments the start times of segments within one channel may be different than the start times of segments within another channel. While offset segment start times can be beneficial they are not mandatory. If the start times of the segments were identical, the users, with requests occurring randomly, may have to wait until the next single start time for an allocation; this may result in significant delays. Offsetting segment start times tends to reduce these delays and thereby improve performance. Also, if start times are aligned, significant allocation processing may occur concurrently which is not desirable in cases where processing resources are limited. In addition, with segment start times occurring concurrently, there will tend to be a concentration of the active segments. With offset start times, the active segment transmissions will tend to be more distributed, reducing interference throughout the system.

In accordance with the invention, the start times of a plurality of segments in different channels may be defined and stored so that the start times are distributed to minimize the variation in the maximum number of segments that start in any given time slot. By minimizing the variation in the maximum number of slots that start in any given slot, the allocation message structure can be made more efficient, and require less resources, e.g. bandwidth, making that bandwidth available for other uses, e.g., more user data. For a high variation in start times, the allocation channel allocates bandwidth for the highest number of possible concurrent start time messages; however, when lower numbers of segments start, those reserved may go partially unused yet still use up bandwidth, and thus the bandwidth can be wasted. With minimum variation in start times, air link resources can be conserved.

In accordance with the invention, in comparing transmission segment types with the same number of transmission units, e.g. tone-symbols, transmission segment types may be differentiated between segments with more transmission units per unit time sometimes referred to as "tall" segments, e.g. those with more tones, as opposed to segments with less transmission units per unit time sometimes referred to as "long" segments, e.g., less tones per symbol time but longer time duration of the segment.

In accordance with the invention, allocation of segments to different devices, e.g., wireless terminals, or users may be based upon a determination made as to which user has the better transmission channel conditions. In accordance with the invention, the user with the better transmission channel conditions is assigned segments with more transmission units per unit time, while another user is assigned segments with less transmission units per unit time. Also considerations such as limited transmission power concerns of the wireless terminals may be taken into account when assigning segments.

In accordance with the invention, the allocation of power per transmission unit to be used to transmit segments of different transmission segment types may also be based upon the type of segment, e.g. does the segment type have more transmission units per unit time or less transmission units per unit time. In some embodiments the transmission segments with less transmission units per unit time are allocated more transmission power per transmission unit than the transmission segments with more transmission units per unit time. In some cases, the power level difference allocated on per transmission unit basis between the two types of segments is at least a factor of 2.

In accordance with the invention, the base station utilizes the segmentation and allocation methods of the invention to effectively utilize the air link resources. The base station and wireless terminals interchange information to classify users, based upon interference levels, channel quality reports and evaluations, power information, user requests, and user priority. The base station uses the structural information in the segmentation scheme, e.g. classifications of types of segments, with known performance advantages and disadvantages associated with each type, to match users to types of segments to effectively and efficiently balance the system.

DETAILED DESCRIPTION

In one embodiment of the invention, the traffic channel includes a plurality of series of traffic channel segments. A traffic channel segment occupies certain air link resources for fixed finite time duration. For example, an exemplary traffic segment may occupy a specified bandwidth for a given time interval. At any given time, there can be multiple traffic channel segments that are active. For example, different traffic segments concurrent in the time domain with non-overlapping bandwidth allocation may have been assigned to different users.

Figure 1:
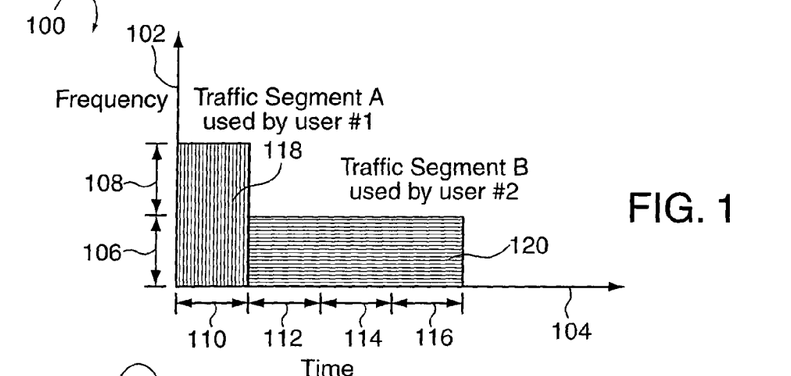
FIG. 1 illustrates two exemplary traffic channel segments illustrating that the air link resource occupied by a traffic segment may vary from one segment to another.

The amount of air link resource occupied by a traffic channel segment may vary from one traffic channel segment to another. FIG. 1 shows a graph 100 of frequency on the vertical axis 102 and time on the horizontal axis 104. The frequency domain includes two equal size frequency units 106, 108. The time domain includes 4 equal size slots 110, 112, 114, 116. In FIG. 1, an exemplary first segment, segment A 118, illustrated with vertical line shading, occupies one time slot 110 and two frequency units 106 and 110. An exemplary second segment, segment B 120, illustrated with horizontal line shading, occupies three time slots 112, 114, and 116 and one frequency unit 106. Segment A 118 may be assigned and used by a first user, user # 1. Segment B 120 may be assigned and used by a second user, user #2.

The air link resource could have been structured in terms of code units over time. In a similar manner to the FIG. 1 exemplary illustration, if air link resource is represented in terms of code units over time, segment A could have been structured to include one time slot and two code units while segment B could have been structured to include three time slots and one code unit.

Figure 2:
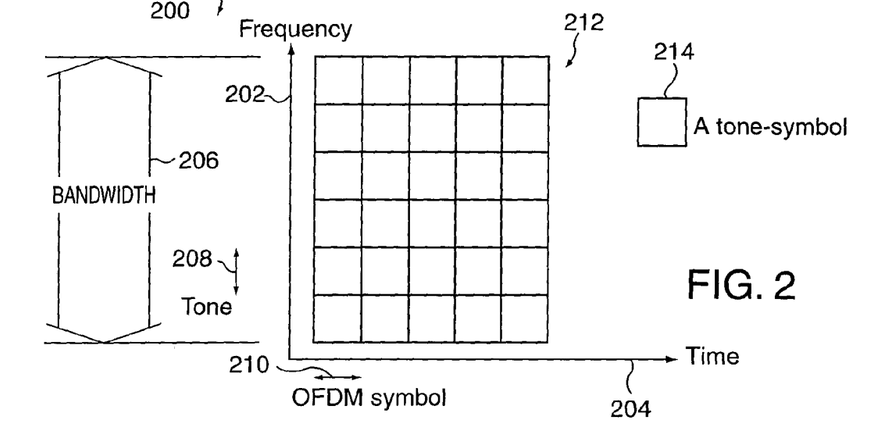
FIG. 2 illustrates air link resources in the context of an exemplary OFDM system.

FIG. 2 illustrates a graph 200 of frequency on the vertical axis 202 vs time on the horizontal axis 204 which may be illustrative, for the purpose of explanation of the invention, in the context of an exemplary OFDM system using traffic channel segments. In the OFDM system, available bandwidth 206 is divided into a number of orthogonal tones 208, e.g. six tones are shown in FIG. 2. At any OFDM symbol period 210, any of the tones 208 can be used to transmit a complex number representing the information to be communicated. FIG. 2 shows 5 OFDM symbol periods 210. The basic unit of the air link resource is a tone 208 at an OFDM symbol 210, which is called a tone-symbol 214, illustrated by a square in FIG. 2. Air link resource 212 of FIG. 2 includes 30 tone-symbols 214. Each tone-symbol 214 can be used to transmit a modulation symbol that carries information. A segment includes one or a plurality of tone-symbols 214 over a fixed time interval. The invention is described in this application using the OFDM system as an exemplary system, with the understanding that the invention is applicable to other systems as well, such as, e.g., systems using Code Division Multiple Access (CDMA), Time Division Multiple Access (TDMA).

A traffic channel segment is the basic unit of the traffic channel resource. In the some embodiments, there are downlink and uplink traffic channel segments. The traffic channel resource is allocated in a form of traffic segment allocation. That is, the base station assigns traffic channel segments to the users, e.g., wireless terminals, in the cell such that the assigned users receive data/voice traffic in the assigned downlink traffic segments or transmit data/voice traffic in the assigned uplink traffic segments. The allocation of traffic segments can be different from one segment to another. For example, in FIG. 1, segment A 118 is assigned to user #1 and segment B 120 is assigned to use #2. In order to enhance the system performance and user experience, in some embodiments, the time duration of a traffic segment is short such that the base station can rapidly assign the traffic channel segments to different users according to their traffic needs and channel conditions, which may be time varying in general. The traffic channel can be thus effectively shared and dynamically allocated among different users in a segment-by-segment manner.

In one embodiment, the amount of air link resource, i.e., the number of tone-symbols, of individual traffic channel segments is the same. For example, one segment can have 10 tone-symbols over 5 OFDM symbol periods, while another segment can have 2 tone-symbols over 25 OFDM symbol periods. Advantageously, having the same number of tone-symbols for all the traffic channel segments can facilitate retransmission (ARQ, automatic repeat request). For example, suppose that the user data information is conveyed by a set of modulation symbols with certain coding and modulation scheme. Those modulation symbols are transmitted with the tone-symbols of a traffic channel segment. Assume the receiver is unable to successfully receive the segment. Then, the same set of modulation symbols can be retransmitted with any subsequent traffic channel segment, as each of the segments have the same number of tone-symbols.

Figure 3:
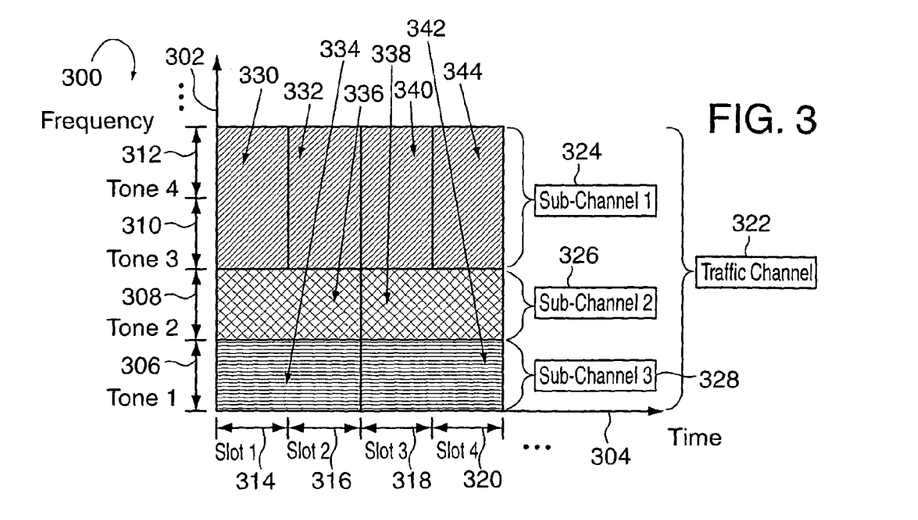
FIG. 3 illustrates one embodiment of constructing traffic channel segments where the traffic channel is divided into multiple sub-channels in the frequency space and each sub-channel is divided into a sequence of segments in the time space in accordance with the present invention.

One embodiment of constructing traffic channel segments is to first divide the traffic channel into multiple sub-channels in the frequency space and then divide each sub-channel into a sequence of segments in the time space. FIG. 3 illustrates such a construction of traffic channel segments in an exemplary OFDM system. FIG. 3 includes a graph 300 of frequency on the vertical axis 302 vs time on the horizontal axis 304. Suppose the traffic channel occupies a fixed number of tones. In FIG. 3, exemplary traffic channel 322 occupies 4 tones, tone 1 306, tone 2 308, tone 3 310, and tone 4 312, those traffic channel tones are contiguous for the sake of Illustration in FIG. 3. In reality, those tones can be, and often are, non-contiguous. The set of traffic channel tones 306, 308, 310, 312, is divided into a few disjoint subsets, each of which is to be used by a sub-channel. FIG. 3 shows 3 sub-channels: sub-channel 1 324, illustrated with diagonal line shading, sub-channel 2 326, illustrated with cross hatch shading, and sub-channel 3 328, illustrated with horizontal line shading. Note that the number of tones occupied by each sub-channel can be different. Sub-channel 1 324 occupies 2 tones: tone 3 310 and tone 4 312; sub-channel 2 326 occupies 1 tone, tone 2 308; sub-channel 3 308 occupies 1 tone, tone 1 306. Each sub-channel 324, 326, 328 is further divided into a sequence of an infinite number of segments. FIG. 3 illustrates the first 4 time slots: slot 1 314, slot 2 316, slot 3 318, and slot 4 320. If one supposes the segments have the same size, e.g. same amount of air link resource, then the time duration of a segment of a sub-channel with larger number of tones is shorter than that of a segment of a sub-channel with smaller number of tones. Each "tall" segment 330, 332, 340, 344 of sub-channel 1 324 occupies 2 tones (tone 3 310 and tone 4 312) over one time slot. Each "short" segment 336, 338 of sub-channel 2 326 occupies one tone (tone 2 308) over 2 time slots. Each "short" segment 334, 342 of sub-channel 3 328 occupies one tone (tone 1 306) over two time slots.

A reason of organizing the traffic channel in segments is to have great freedom of allocating the traffic channel. U.S. patent application Ser. No. 09/706,377 describes a system where each traffic channel segment is independently allocated. Thus, those segments can be potentially allocated to different users rapidly, thereby enabling highly efficient statistical multiplexing. In that system, there is an assignment channel, which is separate from the traffic channel. Each traffic channel segment is associated with an assignment channel segment, which is used to send an allocation message that specifies the identifier of the user allocated to that traffic segment. In general, an assignment segment is transmitted no later than the corresponding traffic segment. In one embodiment of the system, the time difference between an assignment segment and the corresponding traffic segment is constant, which represents the minimum requirement due to storing or decoding the received control information.

Figure 4:
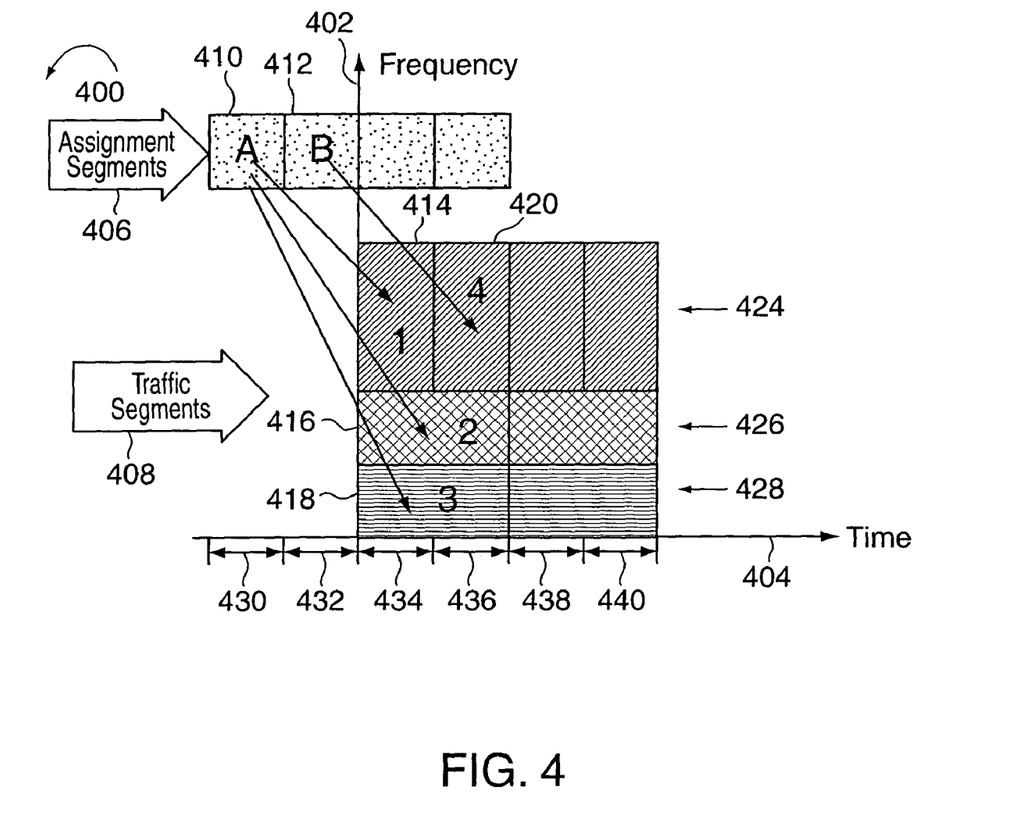
FIG. 4 illustrates one example of arranging the assignment channel and the traffic channel in accordance with the present invention.
Figure 5:
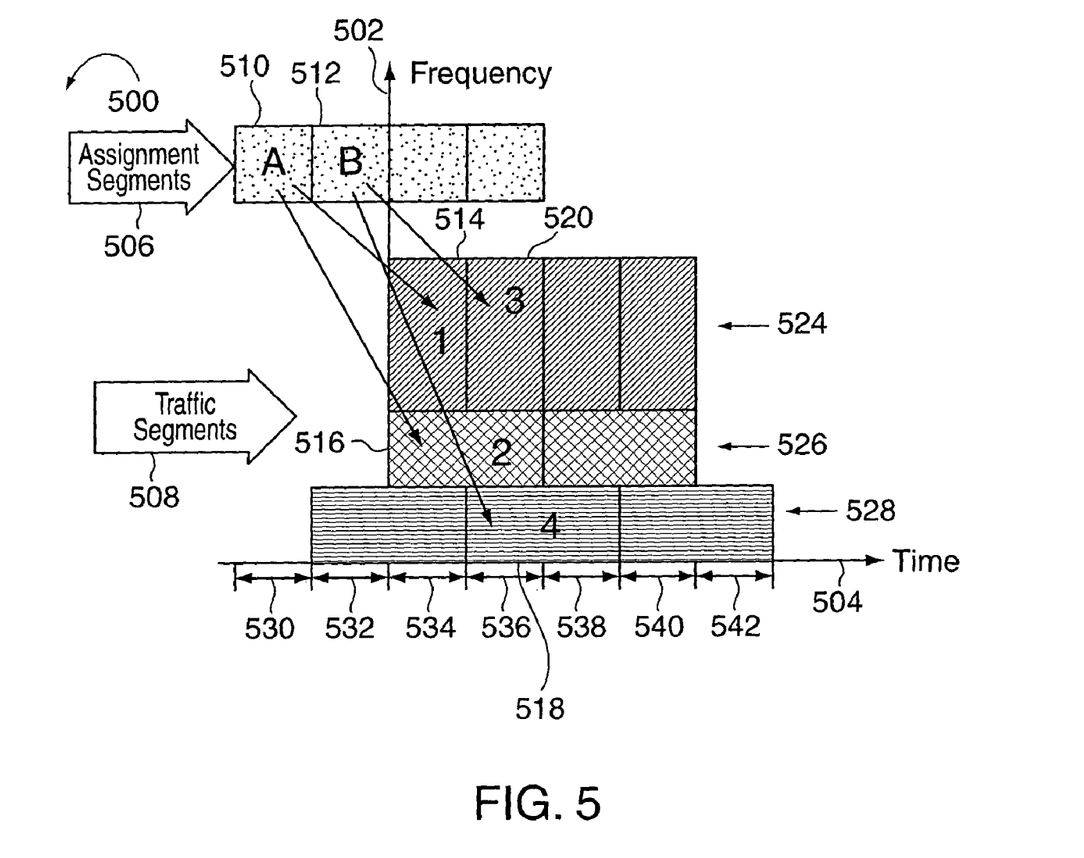
FIG. 5 illustrates another example of arranging the assignment channel and traffic channel, where the traffic channel segments have been staggered achieving more efficient use of assignment channel segments, in accordance with the present invention.

FIG. 4 and FIG. 5 illustrates two examples of arranging the assignment channel and the traffic channel. In both examples, each assignment channel segment has a fixed number information bits. Although not necessary, this arrangement may be desirable because each assignment segment now can use the same coding and modulation scheme.

FIG. 4 includes a graph 400 of frequency on the vertical axis 402 vs time on the horizontal axis 404. Assignment segments 406 are indicated with dot shading, and include an assignment, a segment 410 and an assignment B segment 412. Traffic segments 408 are subdivided into sub-channels. Sub-channel 1 424 is illustrated with diagonal line shading and includes a traffic segment #1 414 and a traffic segment #4 420. Sub-channel 2 426 is illustrated with cross hatch shading and includes a traffic segment 92 416. Sub-channel 3 428 is illustrated with horizontal line shading and includes traffic segment #3 418. In FIG. 4, the time domain is divided into slots, and successive six slots 430, 432, 434, 436, 428, 440 are shown.

In the first example of assignment/traffic segment arrangement shown, illustrated by FIG. 4, the segments of the sub-channels are structured such that the number of the traffic segments that start at any slot varies from 1 to 3. For example, at the start slot 434, 3 traffic segments 414, 416, 418 start; however, at the start of time slot 436 one traffic segment 420 starts. Consequently, each assignment channel segment 410, 412 includes the capability to include at least three allocation messages. Assignment A segment 410 conveys 3 allocation messages for traffic segments 1 414, traffic segment 2 416, and traffic segment 3 418. When only one traffic segment starts, the corresponding assignment segment includes only one allocation message, and the remaining information bits, which would be available for another two allocation messages, are unused. Assignment B segment 412 conveys one allocation message for traffic segment 4 420. As the assignment channel is to be broadcast to most of the users in the system, any information bits in the assignment channel cause significant power resource. Hence, in the example of FIG. 4, the unused information bits in the assignment channel, e.g. in assignment B segment 412, waste the system resource.

FIG. 5 includes a graph 500 of frequency on the vertical axis 502 vs time on the horizontal axis 504. Assignment segments 506 are indicated with dot shading, and include an assignment A segment 510 and an assignment B segment 512. Traffic segments 508 are subdivided into sub-channels. Sub-channel 1 524 is illustrated with diagonal line shading and includes a traffic segment #1 514 and a traffic segment #3 520. Sub-channel 2 526 is illustrated with cross hatch shading and includes a traffic segment #2 516. Sub-channel 3 528 is illustrated with horizontal line shading and includes traffic segment #5 518. In FIG. 5, the time domain is divided into slots, and seven successive slots 530, 532, 534, 536, 538, 540, 542 are shown.

FIG. 5 illustrates another exemplary embodiment of the invention in which the segments of the sub-channels are staggered in time such that the number of the traffic segments that start at any slot has the minimum variation.

Specifically, the segments of the sub-channels are structured such that the number of the traffic segments that start at any slot is 2. For example, at the start of time slot 534, traffic channel segment # 1 514 and traffic channel segment #2 516 start based upon the assignment from assignment A segment 510. At the start of time slot 536, traffic channel segment # 3 520 and traffic channel segment #4 518 start based upon the assignment from assignment B segment 512. Consequently, each assignment channel segment 510, 512 include two allocation messages and does not leave information bits unused due to structure. Thus the implementation of FIG. 5, using reserved bits (resources) for 4 allocation messages/4 traffic segments is more efficient over the implementation of FIG. 4, using reserved bits (resources) for 6 allocation messages/4 traffic segments.

Given a coding and modulation scheme, traffic channel segments of different shapes result in different burst data rates, and therefore can be allocated to meet the rate and delay requirement of different users. For example, a "tall" segment, which has a large number of tones over a short time interval, e.g. segment 514 of FIG. 5, results in higher burst data rate than a "long" segment, which has a small number of tones over a long time interval, e.g., traffic segment 516 of FIG. 5. Hence, a tall segment can be allocated to a user that is sensitive to delay while a long segment can be allocated a user that is insensitive to delay. In addition to the above traffic service consideration, the physical layer consideration can also be taken into account when traffic channel segments are allocated.

In the uplink, when a user, e.g., wireless terminal, transmits a traffic channel segment to the desired base station, the user also generates interference to adjacent base stations as well. Roughly speaking, if the ratio of the signal power received at the desired base station to the interference power received at the adjacent base stations is small, the user is considered in a "bad" location. If the ratio is large, the user is considered in a "good" location. In one embodiment, tall segments should be allocated to users in a good location, while long segments should be allocated to users in a bad location to control the interference. In addition, the user terminal has often limited transmission power capability, because of the battery power or power amplifier consideration. To improve the air link robustness, it is desirable to allocate long segments to users far from the base station from the path loss perspective.

In the downlink, when a user receives a traffic channel segment from the desired base station, the user also sees interference from adjacent base stations as well. Roughly speaking, if the ratio of the signal power received from the desired base station to the interference power received from the adjacent base stations is small, the user is considered in a "bad" location. If the ratio is large, the user is considered in a "good" location. For a user in a good location, the capacity of the communication channel is often bandwidth limited, in the sense that even if the transmission power is doubled, the capacity may be much less than doubled (power saturation). For a user in a bad location, the capacity of the communication channel is often power limited, in the sense that even if the transmission bandwidth is doubled, the capacity may be much less than doubled (bandwidth saturation). In one embodiment, multiple users are allocated to the simultaneous traffic segments, each with a sub-channel. The set of simultaneous scheduled users includes users in a good location and users in a bad location. Users in a good location are allocated to tall segments, while users in a bad location are allocated to long segments. Furthermore, consider the normalized transmission power of those traffic segments, which is defined as the allocated power for each tone-symbol of the segments. The normalized transmission power used in tall segments is preferably smaller than that used in long segments. In one embodiment, each sub-channel is allocated a fixed budget, which is a fraction of the total transmission power budget. The transmission power of the segments of each sub-channel is thus bounded by that fixed budget.

In some embodiments users may be classified in a plurality of levels between "good location" and "bad location" definitions. Similarly, the types of segments may be classified in a plurality of levels between "tall segments" and "long segments". In accordance with the invention, the base station may selectively match the pluralities of location definitions with the pluralities of segment definitions to improve overall system performance and robustness.

Figure 6:
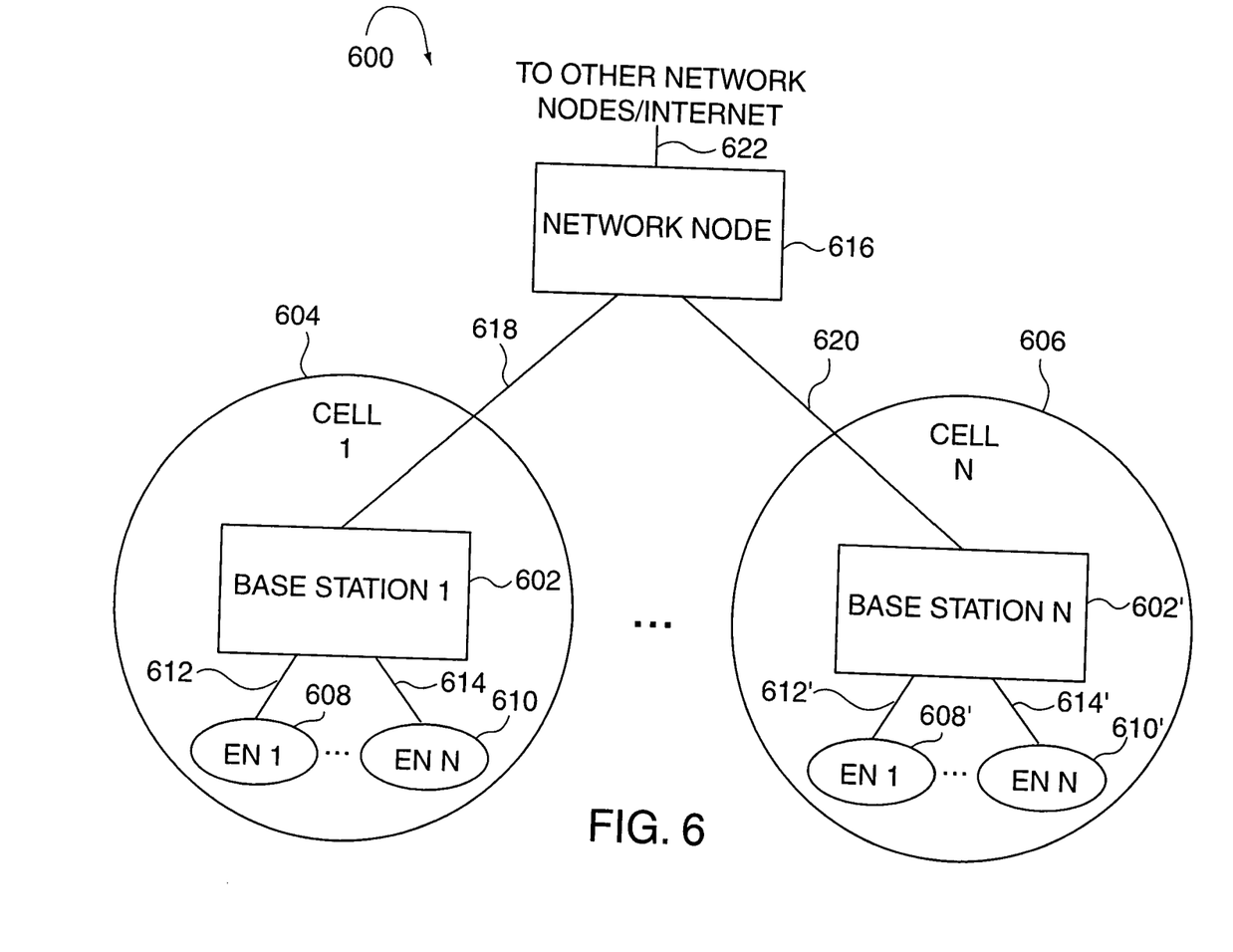
FIG. 6 illustrates an exemplary system using the methods and apparatus of the present invention.

FIG. 6 illustrates an exemplary communications system 600 using apparatus and methods in accordance with the present invention. Exemplary communications system 600 includes a plurality of base station base station 1 (BS 1) 602, base station N (BS N) 602'. BS 1 602 is coupled to a plurality of end nodes (ENs), EN 1 608, EN N 610 via wireless links 612, 614 respectively. Similarly, BS N 602' is coupled to a plurality of end nodes (ENs), EN 1 608', EN N 610' via wireless links 612', 614' respectively. Cell 1 604 represents the wireless coverage area in which BS 1 602 may communicate with ENs, e.g., EN 1 608. Cell N 606 represents the wireless coverage area in which BS N 602' may communicate with ENs, e.g., EN 1 608'. ENs 608, 610, 608' and 610' may move throughout the communications system 600. The base stations BS 1 602, BS N 602' are coupled to a network node 616 via network links 618, 620, respectively. The network node 616 is coupled to other network nodes, e.g., other base station, routers, home agent node, Authentication Authorization Accounting (AAA) server nodes, etc., and the internet via network link 622. Network links 618, 620, 622 may be, e.g., fiber optic cables. Network link 622 provides an interface outside the communications system 600, allowing users, e.g. ENs, to communicate with nodes outside system 600.

Figure 7:
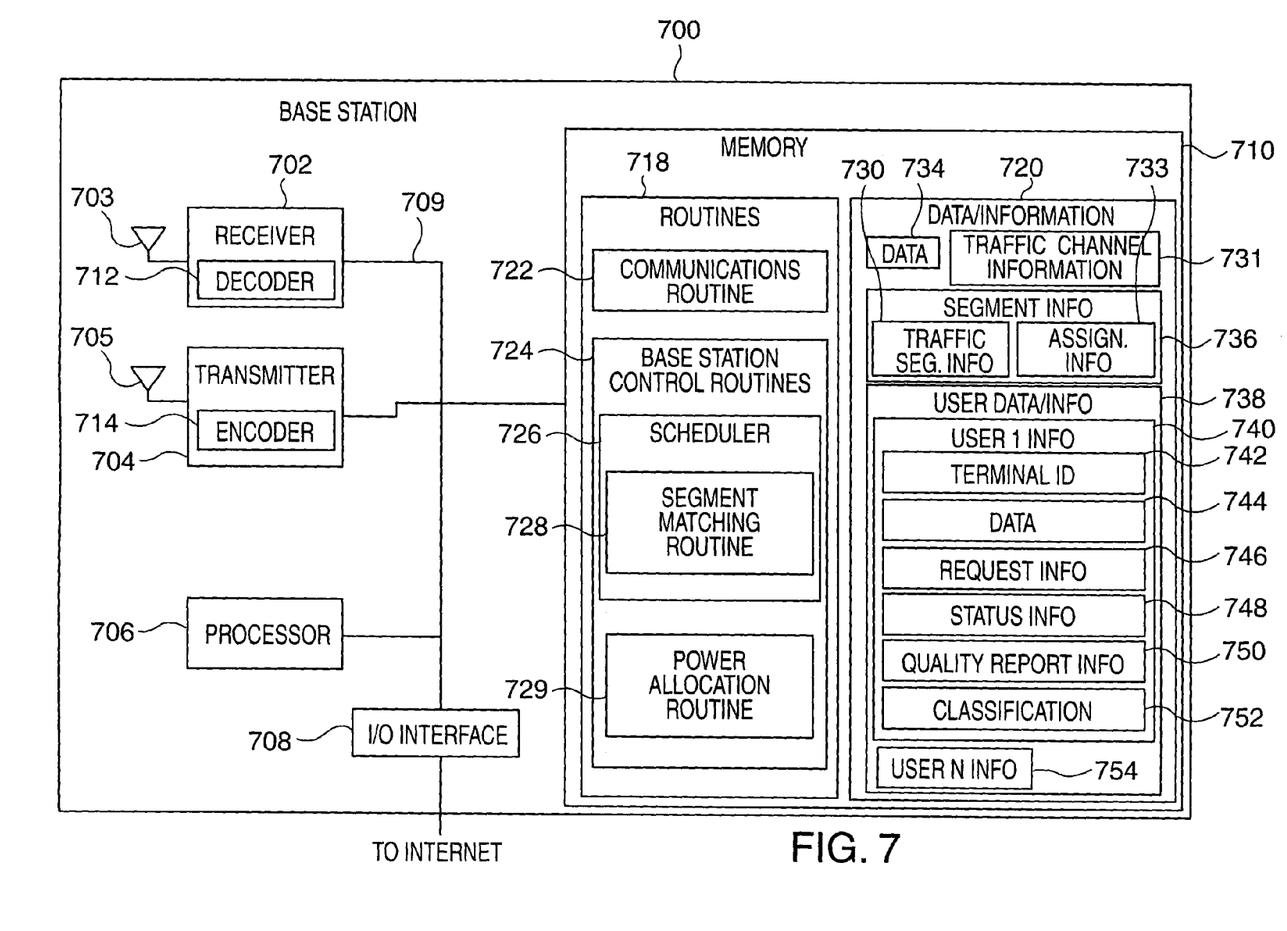
FIG. 7 illustrates an exemplary base station implemented in accordance with the present invention.

FIG. 7 illustrates an exemplary base station 700 in accordance with the present invention. Exemplary base station 700 may be a more detailed representation of base stations 602, 602' of FIG. 6. Exemplary base station 700 includes a receiver 702, a transmitter 704, a processor 706, e.g., CPU, an I/O interface 708 and memory 710 coupled together via a bus 709. The various elements 702, 704, 706, 708, and 710 may exchange data and information over bus 709.

The receiver 702 and the transmitter 704 are coupled to antennas 703, 705, respectively, providing a means for the base station 700 to communicate, e.g. interchange data and information, with end nodes, e.g. wireless terminals, within its cellular coverage area. The receiver 702, including a decoder 712, receives and decodes signaling, which had been encoded and transmitted by end nodes operating within its cell. The transmitter 704 includes an encoder 714, which encodes signaling prior to transmission.

The memory 710 includes routines 718 and data/information 720. The processor 706 controls the operation of the base station 700 by executing routines 718 and utilizing data/information 720 in memory 710 to operate the receiver 702, the transmitter 704, and the I/O interface 708, to perform the processing controlling basic base station functionality, and to control and implement the new features and improvements of the present invention including scheduling of users to traffic segment. I/O interface 708 provides base station 700 with an interface to the internet and other network nodes, e.g., intermediate network nodes, routers, AAA server nodes, home agent nodes, etc., thus allowing end nodes communicating through wireless links with base station 700 to connect, communicate, and interchange data and information with other peer nodes, e.g., another end node, throughout the communication system and external to the communication system, e.g., via the internet.

Routines 718 include communications routines 722, and base station control routines 724. The base station control routines 724 includes a scheduler 726 with a segment matching routine 728. The data/information 720 includes data 734, segment information 736, and user data/info 738. The user data/info 738 includes a plurality of user information, user 1 information 740, user n information 754. Each user information, e.g., user 1 info 740, terminal Identification (ID) 742, data 744, request information 746, status info 748, quality report information 750, and classification information 752.

Data 734 may include received data from end nodes (wireless terminals), data to be transmitted to end nodes, data being processed, and data to support the functionality of the base station 700. Segment information 736 includes information on the number of segments, type of segments, status of segments, size of segments, sets of tones in segments, number of tone-symbols per segment, relative positioning of segments, categorization of segments, traffic segment information 730 and assignment segment information 733. Traffic segment info 730 includes segment type information for a plurality of predetermined segment types. Traffic segment information includes information defining segment slot times, and information defining which segments are "tall segments", e.g. large # of tones, and which segments are "long segments", e.g., longer time interval but fewer tones. Sets of information defining aspects of individual traffic segment types are included in some embodiments. Traffic channel information 731 includes information about different traffic channels. Each traffic channel includes a plurality of segments normally corresponding to a single segment type. A single segment is included in most traffic channels at any given time, e.g., traffic channels are normally one segment high. Traffic channel information 731 includes traffic channel size and structure, information defining sub-channel composites. It also includes information about segment start times for each traffic channel.

Figure 9:
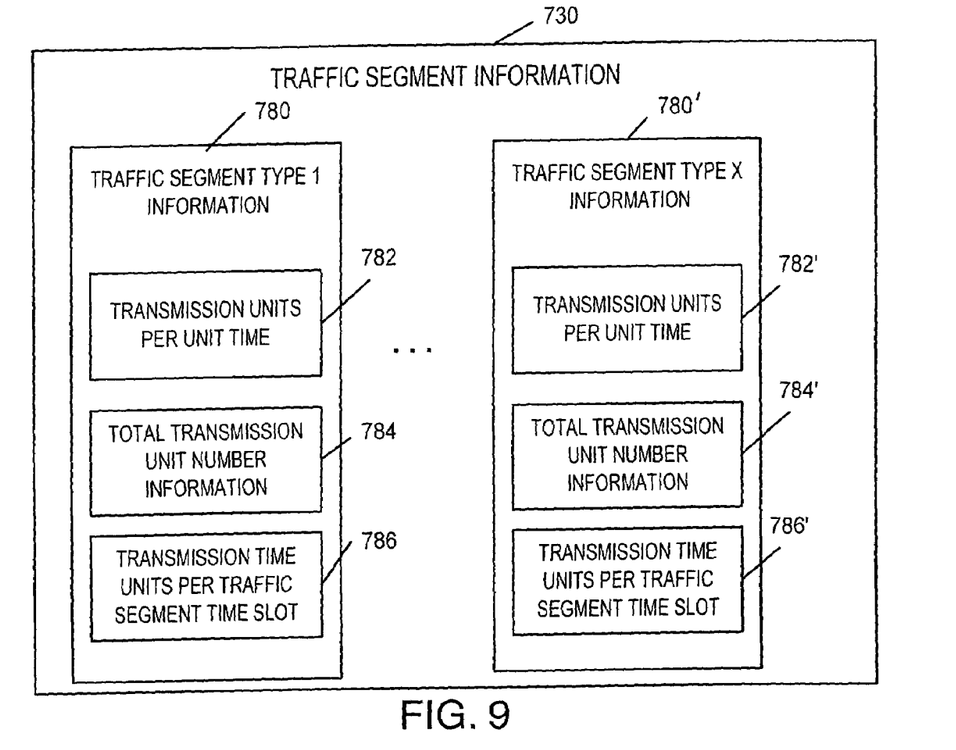
FIG. 9 illustrates an exemplary set of traffic segment information which may be stored in a base station and/or wireless terminal prior to traffic segment assignments.

An exemplary set of traffic segment information 730 is shown in FIG. 9. In the illustrated embodiment, traffic segment information includes a plurality of X sets of information, each one of the x sets of information defining a different type of traffic segment. Each set of traffic segment type definition information 780, 780' includes information 782, 782' indicating the number of transmission units per unit time period which are included in a traffic segment. This information may be thought of as defining the height of a traffic segment since it indicates the number of units to be transmitted in a unit time period, e.g., a symbol time, in a segment of the type defined by the information set 780, 780'. The set of traffic segment type information 780, 780' also includes total transmission unit number information 784, 784'. This information indicates the total number of transmission units in a segment of the type defined by the set 780, 781 of traffic information. The total number of transmission units may be specified as a fixed number, as a number of unit transmission time periods or in some other manner. When specified as a number of unit transmission time periods, the number of total transmission units in a segment of the defined type is equal to the transmission units per unit time indicated in information 782, 782' times the corresponding number of unit transmission time periods indicated in information 78, 784'. Each transmission segment is divided into one or more time slots. Each set of information 780, 780' includes information indicating the number of transmission unit time periods, e.g., transmission symbol times, in each time slot for the defined traffic segment type. When considered in combination with the transmission unit per unit time information 782. 784, information 786, 786' can be considered as indicating the number of transmission units per traffic segment time slot for a segment of the defined type. As will be discussed below, both base stations and wireless terminals may store traffic segment information 730 and use this information in combination with assignment information to determine the shape, duration and/or total data capacity of an assigned traffic segment.

Figure 10:
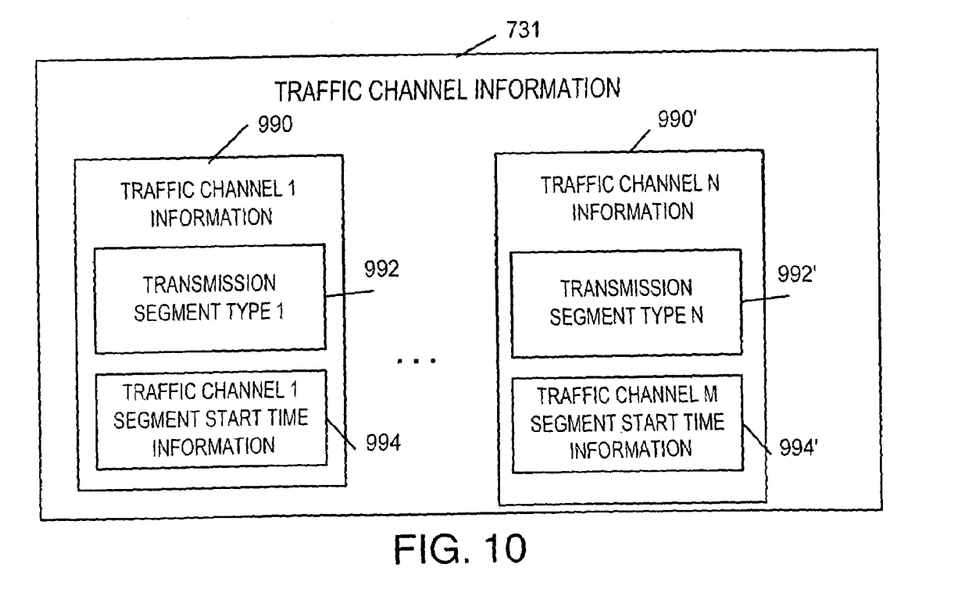
FIG. 10 illustrates sets of traffic channel information, e.g., predetermined traffic channel information, that may be stored in base stations and/or wireless terminals and used to make or interpret traffic channel segment assignments which can correspond to different traffic channels for which predetermined information is stored.

Traffic segment information 730 is used in combination with traffic channel information 731. FIG. 10 illustrates and exemplary set of traffic channel information 731. The exemplary traffic channel information 731 includes N sets of traffic channel information 990, 990' where each set includes information corresponding to, e.g., defining, one of N traffic channels. The set of information 990, 990' corresponding to each traffic channel includes information 992, 992' indicating the type of segment used in the traffic channel and information 994, 994' indicating the start time of the segments which form the traffic channel. Segment start times of different channels may, and often are, staggered to minimize the maximum delay between any two consecutive segment start times of a set of traffic channels being used. Thus, segment start time information 994 and 994' will normally be different.

Assignment segment information 733 includes information specifying the number of traffic segments that may be assigned at the start of one slot based on the traffic segment system structure, and timing information between the assignment segments and traffic segments. Terminal ID 742 is a base station defined identification for the user, e.g., wireless terminal. Data 744 may include specific user data such as data to be transmitted to user 1. Request info 746 may include requests from the user for a change of state, requests for more allocation of bandwidth, power requests, burst data rate requests, sensitivity of the user to delays, etc. Status information 748 may include the present state of the user, e.g. sleep, hold, on, user power level status and interference levels the user is experiencing. Quality report information 750 may include feedback information from the user concerning downlink channel quality, levels of interference being experienced, etc. Classification information 752 may include a category that the user has been placed in concerning type of traffic segments to be allocated, e.g. whether the wireless terminal is considered a "good location" unit or a "bad location" unit.

Communications routines 722 includes various communications applications which may be used to provide particular services, e.g., IP telephony services or interactive gaming, to one or more end node users. Base station control routines 724 performs functions including basic control of the signal generation and reception, control of data and pilot hopping sequences, control of encoder 712 and decoder 714, scheduling, allocation of bandwidth to users, scheduling users to terminal IDs 744, and control of the output transmission power from the base station 700.

The base station control routines also include a scheduler 726, which schedules users, e.g., wireless terminals, to terminal IDs 742. The scheduler 726 includes a segment matching routine 728 which performs segment matching, e.g. allocation of traffic channel segments to wireless terminals, in accordance with the methods, features, techniques, and structures of the present invention.

In some embodiments, segment matching routine allocates segments of different segment types as a function of transmission channel. As part of the allocating process, the segment matching routine determines which of multiple devices, e.g., first and second wireless terminals, has better transmission channel conditions. This is normally determined from channel quality feedback information provided by each of the wireless terminals to the base station for power control and/or scheduling purposes. In accordance with one such embodiment, the segment matching routine allocated transmission segments of a first type to the wireless terminal with the better channel conditions and segment of a second type to a wireless terminal that has a lower quality communications channel. The segments of the second type are usually longer than the segments of the first type. Thus, wireless terminals with comparatively bad channel conditions are likely to be allocated segments which include fewer tones per symbol time but include more symbol times than the segments which are allocated to wireless terminals with better channel conditions. In accordance with the present invention, segments of the first and second type are often transmitted at the same time, e.g., with segments of different types being allocated to different wireless terminals.

Power allocation routine 729 allocates power to be used in transmitting segments. In some embodiments the routine allocates a first amount of power per transmission unit to be used in transmitting segments of the first type and a second amount of power per transmission unit to be used in transmitting segments of the second type. In some cases, the second amount of power per transmission unit is at least twice the first amount of power per transmission unit. Since the segments of the second type include fewer tones per symbol time period, the comparatively larger amount of power allocated to the second channel as compared to the first channel does not place an undue burden on the base stations total transmission power budget. Furthermore, since the transmission segment of the first type are used for transmitting to the wireless terminals with the comparatively good channel conditions, lower per tone power transmissions than the power level used when transmitting segments of the second type still provides adequate transmission quality. By allocating a large number of tones to devices with good channel conditions and a comparatively smaller number of tones to devices with poor channel conditions, efficient use of a limited total transmission power budget can be achieved.

In various embodiments the schedule matching routine 728 uses the segment info 736 and the user data/info 738 to attempt to match the user's requests for traffic segments to appropriate segments based upon information such as classification 752, request info 746, and quality report info 750. Segment matching routine 728 tries to balance the requests of the users while trying to maintain an overall high level of performance throughout the system.

Figure 8:
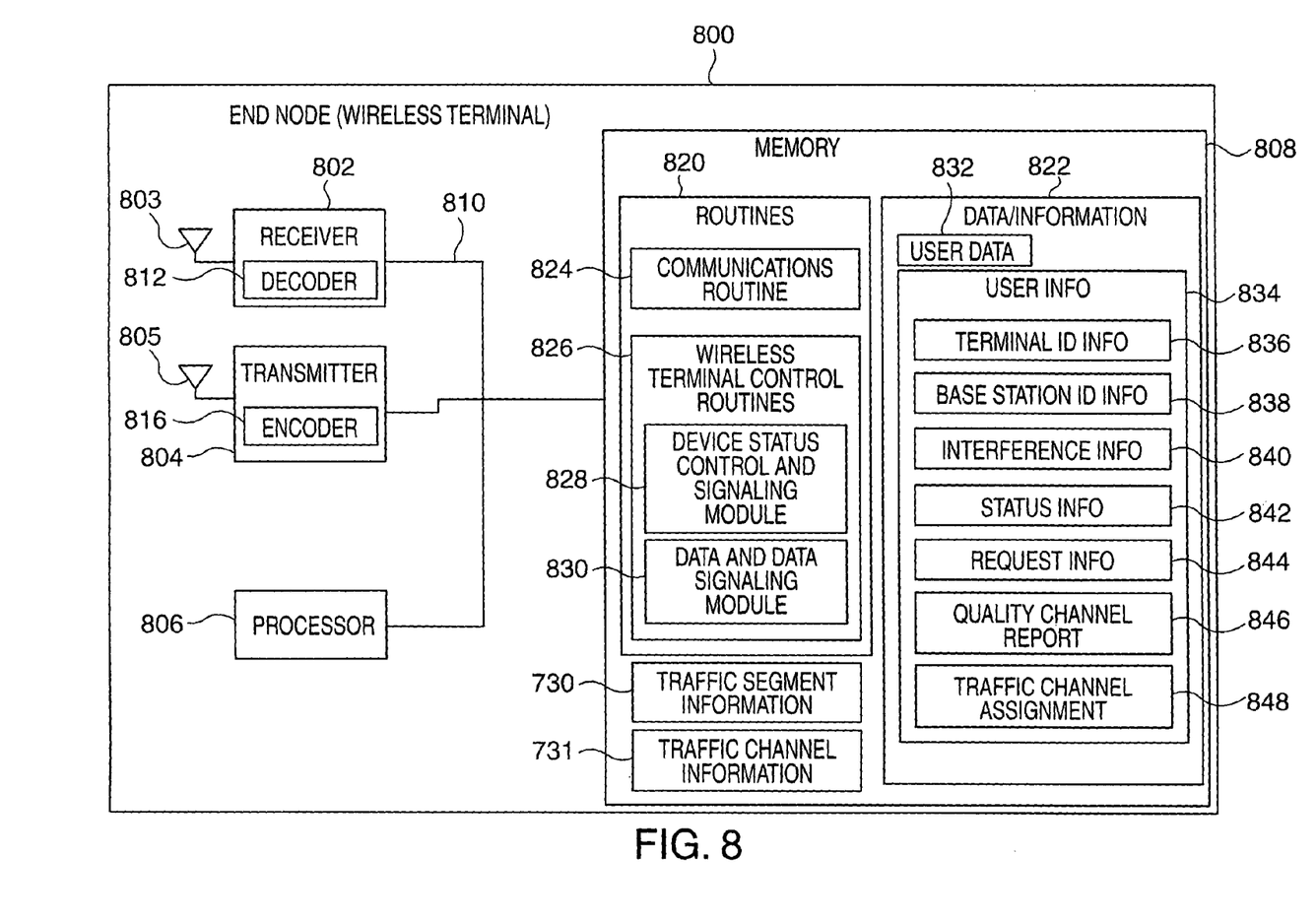
FIG. 8 illustrates an exemplary end node (wireless terminal) implemented in accordance with the present invention.

FIG. 8 illustrates an exemplary end node 800 in accordance with the present invention. Exemplary end node 800 may be a more detailed representation of end nodes 608, 610, 608', 610' of FIG. 6. Exemplary end node 800, e.g., wireless terminal, may be a mobile terminal, mobile, mobile node, fixed wireless device, etc. In this application, references to end node 800 may vary, e.g., wireless terminal, mobile node, etc., and may be used interchangeably. Exemplary end node 800 includes a receiver 802, a transmitter 804, a processor 806, e.g. CPU, and memory 808 coupled together via a bus 810. The various elements 802, 804, 806, 808 may exchange data and information over bus 810.

The receiver 802 and the transmitter 804 are coupled to antennas 803, 805, respectively providing a means for the end node 800 to communicate with the base station 700 via wireless links. The receiver 802 includes a decoder 812. The receiver 802 receives and decodes signaling, e.g. data transmissions, which were encoded and transmitted by a base station 700. The transmitter 804 includes an encoder 816, which encodes signaling prior to transmission.

The memory 808 includes routines 820 and data/information 822 as well as traffic segment information 730 and traffic channel information 731. This information may be the same as, or similar to, the information included in the base station. The processor 806 controls the operation of the end node 800 by executing routines 820 and utilizing data/information 822 in memory 808 to operate the receiver 802 and the transmitter 804, to perform the processing controlling basic wireless terminal functionality, and to control and implement the new features and improvements of the present invention including signaling and processing related to traffic segment requests and allocation in accordance with the invention.

Routines 820 include communications routines 824 and wireless terminal control routines 826. The data/information 822 includes user data 832 and user info 834. User data 832 may include data to be transmitted to the base station 700 and data received from base station 700, e.g., the data conveyed in the traffic segments. Terminal ID info 836 includes the base station assigned user ID. Base station ID information 838 includes information for the wireless terminal to identify the base state, e.g. a value for slope. The wireless terminal 800 may use the terminal ID 836 and the base station ID 838 to determine the data/control and pilot tone hopping sequences.

The terminal ID 836 may also be used to recognize in an assignment segment that resources have been allocated to the wireless terminal 800. Interference information 840 may include measured levels or interference experienced by the wireless terminal. Status information 842 may include state of the wireless terminal sleep, hold, on. Request information 844 may include requests from the wireless terminal for a change of state, more resources, e.g., traffic segments, requests for more power, requests for higher burst data rates, etc. Quality channel report 846 includes information collected such as Signal-to-Noise ratio, downlink channel information, and information on the status of the wireless terminal 800 that may be feed back to the base station 700. Traffic channel assignment information 848 includes information about the assignment segments and the predetermined relationship to traffic segments of various traffic channels. Traffic channel assignment information 848 may also include received assignment information, e.g., information received from one or more assignment segments indicating the assignment of particular traffic channel segments to the wireless terminal. The received assignment information in combination with traffic segment information 730 and traffic channel information 731 is used by the wireless terminal to determine which traffic segments it can use for transmission and/or reception of data and the start time of the assigned segments in the various channels.

Communications routines 824 include various communications applications that may be used to provide particular services, e.g., IP telephony services or interactive gaming, to one or more end node users.

Wireless terminal control routines 826 control the basic functionality of the wireless terminal 800 including the operation of the transmitter 804 and receiver 802, signal generation and reception including data/control hopping sequences, state control, and power control. The wireless terminal control routines 826 include a device status control and signaling module 828 and a data and data signaling module 830. The device status control and signaling module 828 uses the data/info 822 including status info 842 and request info 844 to perform operations including control of signaling and processing related to changes in state which includes requests for more bandwidth, e.g. request for traffic segments in accordance with the present invention. Wireless terminal control routines 826 may also process and evaluate, user info 834 including interference info 840, generate quality report information 846 and signal information included in report info 846 to the base station 700, in accordance with the invention. The data and data signaling module, 830 uses the data/info 822 including terminal ID 836 and traffic channel assignment 848 to performs operations including recognition of assigned traffic segments and signaling associated with the those traffic segments in accordance with the present invention.

The present invention may be implemented in hardware and/or software. For example, some aspects of the invention may be implemented as processor executed program instructions. Alternately, or in addition, some aspects of the present invention may be implemented as integrated circuits, such as, e.g., ASICs.

What is claimed is:

1. A communications method, comprising:
    storing in memory a plurality of sets of information each set of information defining one of a plurality of different transmission segment types, said plurality of sets of information being stored prior to a segment corresponding to one of said transmission segment types being assigned to at least one of a plurality of transmitters;
    a first set of information in said plurality of sets of information defining a first transmission segment type, the first set of information defining a first number of transmission units to be transmitted per unit time in a segment of the first type, and information indicating a first total number of transmission units to be transmitted as part of a segment of the first type over a first period of time, said first period of time being segmented into time slots;
    a second set of information in said plurality of sets of information defining a second transmission segment type, the second set of information defining a second number of transmission units to be transmitted per unit time in a segment of the second type, and information indicating a second total number of transmission units to be transmitted as part of a segment of the second type over a second period of time, said second period of time being segmented into time slots; and
    transmitting information using segments of the first and second types at the same time.

2. The method of claim 1, wherein said first number of transmission units per unit time is different from said second number of transmission units per unit time.

3. The method of claim 2, wherein segments of the first transmission segment type include more transmission units per unit time than segments of the second transmission segment type, the method further comprising:
    allocating segments of the first transmission segment type and segments of the second transmission segment type to first and second devices, said step of allocating including:
        determining which of the first and second devices has better transmission channel conditions; and
        assigning segments of the first transmission segment type to the device determined to have the better transmission channel conditions and assigning segments of the second transmission segment type to the other one of the first and second devices.

4. The method of claim 3, further comprising:
    allocating a first amount of power per transmission unit to be used in transmitting the segments of the first transmission segment type; and
    allocating a second amount of power per transmission unit to be used in transmitting the segments of the second transmission segment type, the second amount of power per transmission unit being larger than the first amount of power per transmission unit.

5. The method of claim 4, wherein the second amount of power per transmission unit is at least twice the first amount of power per transmission unit.

6. The method of claim 1, wherein the first period of time is different from the second period of time.

7. The method of claim 1 wherein said first total number of transmission units is equal to said second total number of transmission units.

8. The method of claim 1, wherein the information defining the first total number of transmission units to be transmitted over the first period of time indicates the number of unit time periods included in said first period of time, said first total number of transmission units being equal to the number of unit time periods included in said first period of time multiplied by the first number of transmission units per unit time.

9. The method of claim 1, further comprising storing N sets of information defining a plurality of N traffic channels,
- a first one of said N sets of information defining a first traffic channel, said first traffic channel being defined as including segments of the first transmission segment type, said first traffic channel including at most one segment of the first type at any given time; and
- a second one of said N sets of information defining a second traffic channel, said second traffic channel being defined as including segments of the second transmission segment type, said second traffic channel including at most one segment of the second segment type at any given time.

10. The method of claim 9, wherein the first one of said N sets of information defining the first traffic channel further includes information indicating start times of segments within said first traffic channel.

11. The method of claim 10, wherein the second one of said N sets of information defining the second traffic channel further includes information indicating start times of segments within said second traffic channel.

12. The method of claim 11, wherein at least some of the start times of segments within said first traffic channel are different from the start times of segments within said second traffic channel.

13. The method of claim 12, wherein the stored information defining a plurality of N channels, includes information indicating N segment start times, each one of the N segment start times being associated with one of the N channels, the N segment start times being distributed to minimize the variation in the maximum number of segments that start in any given time slot.

14. The method of claim 13, where each time slot corresponds to the time used to transmit any single transmission unit.

15. The method of claim 14, wherein each time slot corresponds to an orthogonal frequency division multiplexed symbol transmission time period.

16. The method of claim 11, wherein the first number of transmission units to be transmitted per unit time is different from the second number of transmission units to be transmitted per unit time.

17. The method of claim 11, wherein the indicated start time of segments in the second channel is offset from the indicated start time of segments in the first channel.

18. The method of claim 1 wherein said transmitted information is voice data.

19. A communications apparatus, comprising:
- a memory including a plurality of sets of information each set of information defining one of a plurality of different transmission segment types, said plurality of sets of information being stored prior to a segment corresponding to one of said transmission segment types being assigned to at least one of a plurality of transmitters;
  - a first set of information in said plurality of sets of information defining a first transmission segment type, the first set of information defining a first number of transmission units to be transmitted per unit time in a segment of the first type, and information indicating a first total number of transmission units to be transmitted as part of a segment of the first type over a first period of time, said first period of time being segmented into time slots;
  - a second set of information in said plurality of sets of information defining a second transmission segment type, the second set of information defining a second number of transmission units to be transmitted per unit time in a segment of the second type, and information indicating a second total number of transmission units to be transmitted as part of a segment of the second type over a second period of time, said second period of time being segmented into time slots; and
- a transmitter coupled to said memory for transmitting data in segments of the first and second types at the same time.

20. The apparatus of claim 19, wherein said first number of transmission units per unit time is different from said second number of transmission units per unit time.

21. The apparatus of claim 20, wherein segments of the first transmission segment type include more transmission units per unit time than segments of the second transmission segment type, the apparatus further comprising:
- means for determining which of a first device and a second device has better transmission channel conditions; and
- means for assigning segments of the first transmission segment type to the device determined to have the better transmission channel conditions and assigning segments of the second transmission segment type to the other one of the first and second devices.

22. The apparatus of claim 19, wherein the first period of time is different from the second period of time.

23. The apparatus of claim 19 wherein said first total number of transmission units is equal to said second total number of transmission units.

24. The apparatus of claim 19, wherein the information defining the first total number of transmission units to be transmitted over the first period of time indicates the number of unit time periods included in said first period of time, said first total number of transmission units being equal to the number of unit time periods included in said first period of time multiplied by the first number of transmission units per unit time.

25. The apparatus of claim 19, wherein said memory further includes:
- N sets of information defining a plurality of N traffic channels;
- a first one of said N sets of information defining a first traffic channel, said first traffic channel being defined as including segments of the first transmission segment type, said first traffic channel including at most one segment of the first type at any given time; and
- a second one of said N sets of information defining a second traffic channel, said second traffic channel being defined as including segments of the second transmission segment type, said second traffic channel including at most one segment of the second segment type at any given time.

26. The apparatus of claim 25, wherein the first one of said N sets of information defining the first traffic channel further includes information indicating start times of segments within said first traffic channel.

27. The apparatus of claim 26, wherein the second one of said N sets of information defining the second traffic channel further includes information indicating start times of segments within said second traffic channel.

28. The apparatus of claim 27, wherein at least some of the start times of segments within said first traffic channel are different from the start times of segments within said second traffic channel.

29. The apparatus of claim 28, wherein the stored information defining a plurality of N channels, includes information indicating N segment start times, each one of the N segment start times being associated with one of the N channels, the N segment start times being distributed to minimize the variation in the maximum number of segments that start in any given time slot.

30. The apparatus of claim 29, where each time slot corresponds to the time used to transmit any single transmission unit.

31. The apparatus of claim 27, wherein the first number of transmission units to be transmitted per unit time is different from the second number of transmission units to be transmitted per unit time.

32. The apparatus of claim 27, wherein the indicated start time of segments in the second channel are offset from the indicated start times of segments in the first channel.

33. The apparatus of claim 19, further comprising:
means for allocating a first amount of power per transmission unit to be used in transmitting the segments of the first transmission segment type; and
means for allocating a second amount of power per transmission unit to be used in transmitting the segments of the second transmission segment type, the second amount of power per transmission unit being larger than the first amount of power per transmission unit.

34. The apparatus of claim 33, wherein the second amount of power per transmission unit is at least twice the first amount of power per transmission unit.

35. The apparatus of claim 34, wherein said apparatus is a base station.

36. The apparatus of claim 35, wherein said apparatus is a wireless terminal.

37. An apparatus comprising:
a processor configured to:
store in memory a plurality of sets of information each set of information defining one of a plurality of different transmission segment types, said plurality of sets of information being stored prior to a segment corresponding to one of said transmission segment types being assigned to at least one of a plurality of transmitters,
a first set of information in said plurality of sets of information defining a first transmission segment type, the first set of information defining a first number of transmission units to be transmitted per unit time in a segment of the first type, and information indicating a first total number of transmission units to be transmitted as part of a segment of the first type over a first period of time, said first period of time being segmented into time slots, and
a second set of information in said plurality of sets of information defining a second transmission segment type, the second set of information defining a second number of transmission units to be transmitted per unit time in a segment of the second type, and information indicating a second total number of transmission units to be transmitted as part of a segment of the second type over a second period of time, said second period of time being segmented into time slots; and
transmit information using segments of the first and second types at the same time.

38. A computer readable medium embodying computer executable instructions for controlling a device to implement a communications method, the method comprising:
storing in memory a plurality of sets of information each set of information defining one of a plurality of different transmission segment types, said plurality of sets of information being stored prier to a segment corresponding to one of said transmission segment types being assigned to at least one of a plurality of transmitters,
a first set of information in said plurality of sets of information defining a first transmission segment type, the first set of information defining a first number of transmission units to be transmitted per unit time in a segment of the first type, and information indicating a first total number of transmission units to be transmitted as part of a segment of the first type over a first period of time, said first period of time being segmented into time slots, and
a second set of information in said plurality of sets of information defining a second transmission segment type, the second set of information defining a second number of transmission units to be transmitted per unit time in a segment of the second type, and information indicating a second total number of transmission units to be transmitted as part of a segment of the second type over a second period of time, said second period of time being segmented into time slots; and
transmitting information using segments of the first and second types at the same time.

39. A communications apparatus, comprising:
memory means including a plurality of sets of information each set of information defining one of a plurality of different transmission segment types, said plurality of sets of information being stored prior to a segment corresponding to one of said transmission segment types being assigned to at least one of a plurality of transmitters,
a first set of information in said plurality of sets of information defining a first transmission segment type, the first set of information defining a first number of transmission units to be transmitted per unit time in a segment of the first type, and information indicating a first total number of transmission units to be transmitted as part of a segment of the first type over a first period of time, said first period of time being segmented into time slots, and
a second set of information in said plurality of sets of information defining a second transmission segment type, the second set of information defining a second number of transmission units to be transmitted per unit time in a segment of the second type, and information indicating a second total number of transmission units to be transmitted as part of a segment of the second type over a second period of time, said second period of time being segmented into time slots; and
transmitter means coupled to said memory means for transmitting data in segments of the first and second types at the same time.

40. The apparatus of claim 39, wherein said first number of transmission units per unit time is different from said second number of transmission units per unit time.

41. The apparatus of claim 39, wherein the first period of time is different from the second period of time.

42. The apparatus of claim 39 wherein said first total number of transmission units is equal to said second total number of transmission units.

43. The apparatus of claim 39, wherein the information defining the first total number of transmission units to be transmitted over the first period of time indicates the number of unit time periods included in said first period of time, said first total number being equal to the number of unit time periods included in said first period of time multiplied by the first number of transmission units per unit time.

44. A communications method, comprising:

allocating communications segments of a first transmission segment type and segments of a second transmission segment type to different communications devices for use in communicating information, said allocating being performed as a function of transmission channel conditions, segments of the first transmission segment type having a first number of transmission units per unit time, a first total number of transmission units, and a first segment duration, said first segment duration including a first number of units of time, segments of the second transmission segment type having a second number of transmission units per unit time, a second total number of transmission units and a second number of units of time, said second number of units of time being greater than one whereby said second segment duration includes multiple units of time, segments of said first segment type differing from segments of the second segment type by at least one of: i) segment duration and ii) number of transmission units per unit time; and transmitting information using segments of the first and second types at the same time to said different communications devices.

45. The method of claim 44, wherein said first number of transmission units per unit time is different from said second number of transmission units per unit time.

46. The method of claim 44, wherein the first and second segment durations are different.

47. The method of claim 44, wherein said first total number of transmission units is equal to to said second total number of transmission units.

48. The method of claim 44, wherein allocating communication segments includes:

accessing information indicating the number of unit periods of time included in segments of said first type.

49. The method of claim 44, further comprising:

accessing N sets of information defining a plurality of N traffic channels, a first one of said N sets of information defining a first traffic channel, said first traffic channel being defined as including segments of the first transmission segment type, said first traffic channel including at most one segment of the first type at any given time and a second one of said N sets of information defining a second traffic channel, said second traffic channel being defined as including segments of the second transmission segment type, said second traffic channel including at most one segment of the second segment type at any given time.

* * * * *